United States Patent [19]

Cox

[11] Patent Number: 4,781,595
[45] Date of Patent: Nov. 1, 1988

[54] VISUAL DESIGN AND CHARACTER FORMATION COMPOSITE

[76] Inventor: James A. Cox, 116 Rue du Bois, Cherry Hill, N.J. 08003

[21] Appl. No.: 140,034

[22] Filed: Dec. 31, 1987

[51] Int. Cl.⁴ .............................................. G09B 11/00
[52] U.S. Cl. ........................................ 434/81; 434/84; 434/328
[58] Field of Search ............................ 434/84, 328, 81; 273/378; 40/439, 477, 406

[56] References Cited

U.S. PATENT DOCUMENTS

| | | | |
|---|---|---|---|
| 3,486,752 | 12/1969 | Colruis et al. | 273/378 |
| 3,758,695 | 9/1973 | Goodman et al. | 434/84 |
| 4,038,761 | 8/1977 | Thomas | 434/328 |
| 4,084,332 | 4/1978 | Waloszyk et al. | 434/328 |
| 4,514,177 | 4/1985 | Lerkoff | 434/328 |

Primary Examiner—Ira S. Lazarus
Assistant Examiner—Peggy Neil
Attorney, Agent, or Firm—Austin R. Miller

[57] ABSTRACT

A composite sheet for forming visually observable designs comprising a transparent deformable upper layer having a plurality of pockets formed therein; a transparent intermediate layer sealed to the upper layer along edges of the pockets to form a plurality of containers; a lower layer connected to the intermediate layer, with the lower layer having a plurality of fluid activatable invisible designs formed thereon; and invisible design activation fluid contained within the containers to transform the invisible designs into visually observable designs upon breaking of the intermediate layer adjacent the containers by pressure exerted against the upper layer and subsequent contact of the fluid with the lower layer.

16 Claims, 2 Drawing Sheets

VISUAL DESIGN AND CHARACTER FORMATION COMPOSITE

BACKGROUND OF THE INVENTION

This invention relates to a visual design and character formation composite, particularly to a composite capable of generating designs, colors and lettering on a sheet, for use as an entertainment device or for education.

DESCRIPTION OF THE PRIOR ART

Attempts have been made in the past to provide games, coloring surfaces and educational materials which are safe for use by children, simple to use and manufacture and may be used without risk of exposure to potentially harmful chemicals or messy paints. Such attempts have not been entirely successful in achieving these goals.

For example, U.S. Pat. No. 3,758,695 discloses a novelty and educational image transfer unit wherein flaps, each carrying portions of a design, surround a central design area. The design portions of the flaps are blotted with ink or paint from an adjacent water activated color reservoir, and then folded over into the central design area to transfer the blotted or inked portion. Folding over flaps one at a time creates a completed image in a series of steps. This construction suffers from the disadvantage of having the exposed inks or paints activated by water. A user, such as a small child for example, applies water to the reservoir, thereby creating risk of troublesome staining of clothing, surrounding furniture, skin or the like.

U.S. Pat. No. 3,745,672 discloses chemically treated sheets having invisible but outlined designs which form colored pictures when activated by pencil-like colorless paint applicators. The applicators contain color coded liquids, which when contacted with the treated sheets, produce a desired color. This arrangement requires a separate applicator for each color, with the number of applicators increasing with the number of desired colors. Loss of a particular applicator precludes formation of the corresponding color on the sheets. The user may also be exposed to the potentially toxic chemical, its carrier liquid and any attendant fumes resulting from evaporation.

Similarly, U.S. Pat. No. 3,826,499 discloses game boards for tic-tac-toe, bingo, baseball, black jack, etc., wherein each board is treated with a chemical which remains invisible until contacted with a pencil-like instrument containing an aqueous solution of color changing chemicals. This device also permits exposure to the color changing chemicals and fumes. Further, the game is inoperative without a color changing instrument or pen. The number of potential colors is limited because only a single color changing instrument is provided.

OBJECTS OF THE INVENTION

It is an object of the invention to provide a visual design and character formation composite which is compact and has a single piece construction not requiring multiple actuator pieces.

It is another object of the invention to provide a visual design and character formation composite which does not expose the user to potentially hazardous chemicals, carrier liquids and attendant fumes resulting from evaporation.

It is an important object of the invention to provide a visual design and character formation composite which is self-contained to prevent spillage of mixing and activating fluids to avoid staining the user and surroundings.

It is a further object of the invention to provide a visual design and character formation composite which provides means to entertain and educate persons of all ages.

Other objects and advantages of the invention will become apparent to those skilled in the art from the drawings, the detailed description thereof and the appended claims.

DETAILED DESCRIPTION OF THE INVENTION

Figure 1:
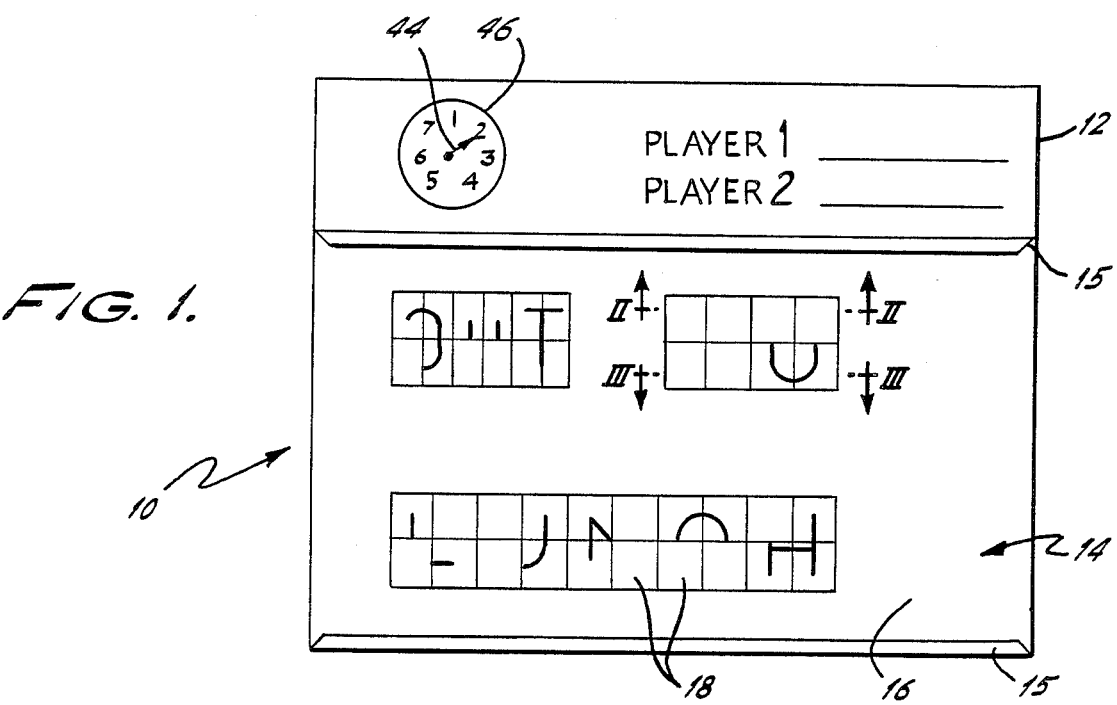
FIG. 1 shows a top plan view of a visual design and character formation composite mounted to a play board in accordance with aspects of the invention.

Although specific forms of apparatus embodying the invention have been selected for illustration in the drawings, and although specific terminology will be referred to in describing those forms in the description which follows, such use is not intended to limit the scope of the invention, which is defined in the appended claims.

Figure 2:
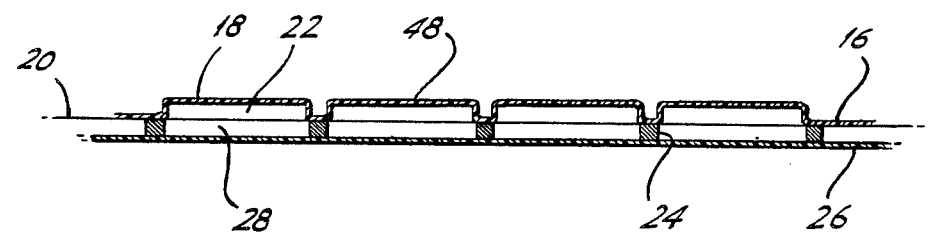
FIG. 2 is a partial cross-sectional view of a composite of the invention taken as indicated by the lines and arrows II—II which appear in FIG. 1.
Figure 3:
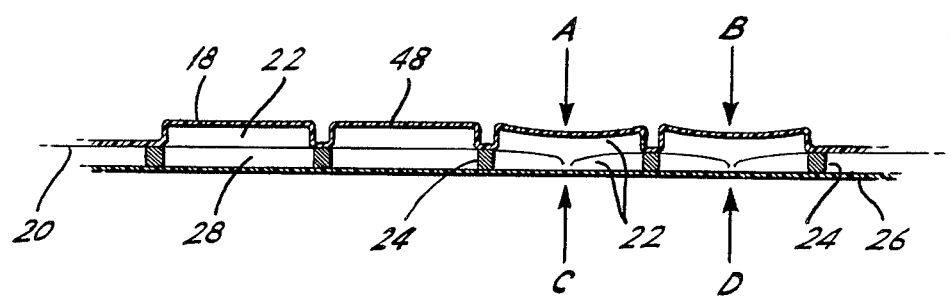
FIG. 3 is a partial cross-sectional view of a composite of the invention taken as indicated by the lines and arrows III—III which appear in FIG. 1.

Referring generally to the drawings, and especially referring to FIG. 1, there is shown a game 10 which comprises a board 12 and a composite 14 embodying aspects of the invention. Board 12 contains spinner 46 and accompanying spinning arrow 44. Composite 14 is mounted to board 12 by way of rigid retainer rails 15. Fluid containers 18 formed in upper layer 16 are the facing layer of composite 14. FIGS. 2 and 3 show an enlarged sectional view of composite 14 having a deformable upper layer 16 with a multiplicity of upwardly projecting fluid containers 18 having upper flat surfaces 48. A fluid retaining layer 20 lying against layer 16 retains fluid 22 within containers 18. Raised separator 24 lies between retaining layer 20 and design sheet 26 and forms spaces 28.

In FIG. 3, portions of upper layer 16 are depressed in containers 18 as indicated at points A and B by finger or a mechanical instrument. Retaining layer 20 has been severed at points C and D and fluid 22 now occupies corresponding spaces 28.

Figure 4:
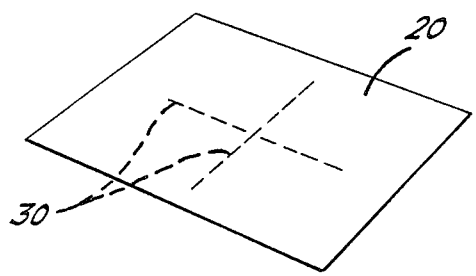
FIG. 4 is a perspective view of a portion of a component layer of a visual design and character formation composite from FIGS. 1 and 2.
Figure 5:
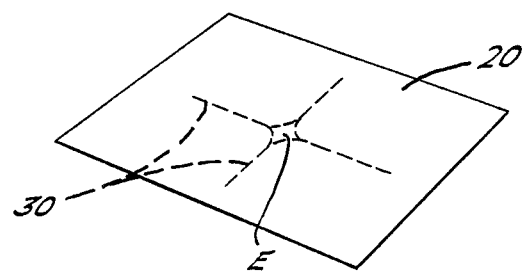
FIG. 5 is a perspective view of a portion of a component layer of a visual design and character formation composite from FIGS. 1 and 3.

FIGS. 4 and 5 show retaining layer 20 separated from composite 14. Retaining layer 20 has weakened portions 30, some of which have been broken at point E in FIG. 5. It is within the scope of the invention that weakened portions 30 be shaped in any suitable manner.

Figure 6:
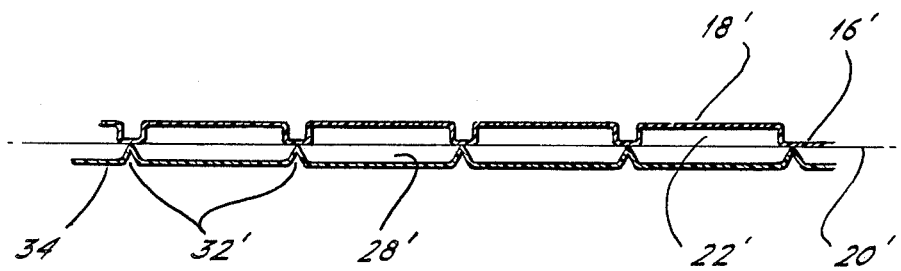
FIG. 6 shows a cross-sectional view of another embodiment of a portion of a composite in accordance with aspects of the invention.

A second embodiment of the invention is disclosed in FIG. 6, wherein an upper layer 16' forms containers 18'. Retaining layer 20' retains fluid 22' within containers 18'. A distinct separator 32 lies between retaining layer 20 and a design sheet 34 and forms spaces 28'.

Figure 7:
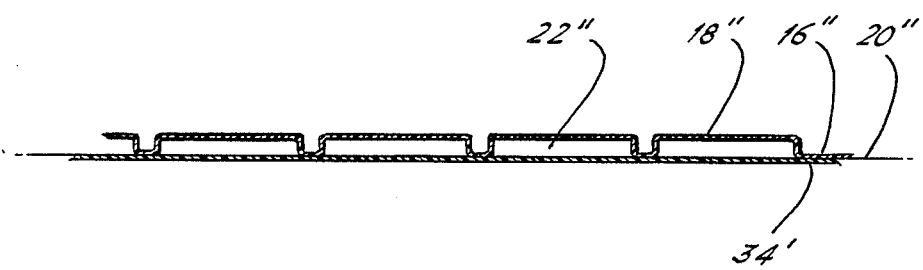
FIG. 7 shows a cross-sectional view of still another embodiment of a portion of a composite of the invention.

In FIG. 7, another embodiment without a separator 34 is shown. Upper layer 16''' forms containers 18'' which contain fluid 22''. Retaining layer 20'' retains fluid 22'' within containers 18''. Design sheet 34' lies directly against retaining layer 20''.

Figure 8:
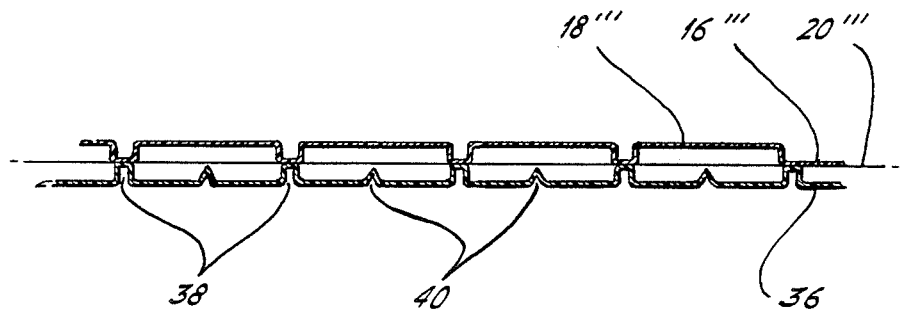
FIG. 8 shows a cross-sectional view of yet another embodiment of a portion of a composite of the invention.

A fourth embodiment of the invention is shown in FIG. 8 wherein upper layer 16''' forms containers 18''' which contain fluid 22'''. Retaining layer 20''' retains fluid 22''' within containers 18'''. Design sheet 36 has upwardly projecting separator 38 which contacts retaining layer 20''' and forms spaces 28'''. Layer breaking tips 40 are positioned on design sheet 36 with one tip 40 being supplied underneath each container 18'''.

Figure 9:
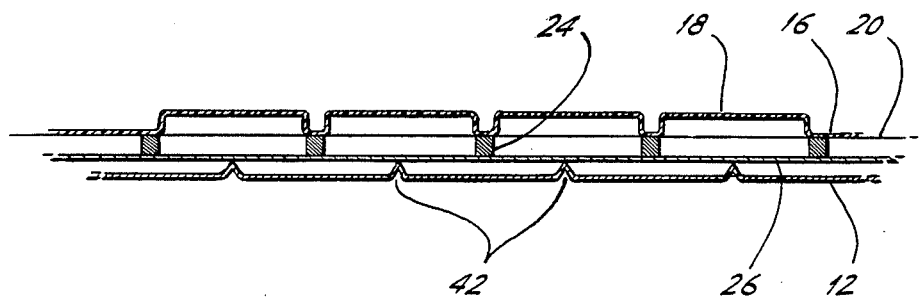
FIG. 9 shows a cross-sectional view of a further embodiment of a portion of a composite of the invention.

In FIG. 9, a composite 14 as shown in FIG. 2 is mounted on board 12. Board 12 has layer breaking tips 42.

Referring to FIGS. 1 to 5, game 10 has a board 12 onto which a visual design and character formation composite is mounted for playing an educational game wherein opposing players attempt to complete a phrase. It is to be understood that the particular game illustrated in FIG. 1 and described below is chosen to illustrate one example in which composite 14 may be utilized.

A first player spins spinner arrow 44 to determine the number of attempts from spinner 46 that the player will receive. An attempt consists of depressing the upper flat portion 48 of a fluid container 18 to cause fluid 22 to activate invisible designs and/or characters for formation of visible designs and characters on design sheet 26. The player chooses whichever containers 18 desired to be activated, and then activates the designs in the portion of design sheet 26 corresponding to the underlying container 18.

Designs are activated when fluid 22 contacts design sheet 26. Application of downward pressure on upper flat surfaces 48 causes fluid 22 to exert pressure on fluid retaining layer 20. Weakened portions 30 in retaining layer 20 give away to such pressure, thereby opening a small hole in retaining layer 20 as shown at point E in FIG. 5. The hole permits fluid 22 to pass therethrough from containers 18 into spaces 28. As soon as fluid 22 contacts design sheet 26, activation of the invisible design begins. Separator 24 prevents fluid 22 from flowing underneath an adjacent container 18. In this manner, the game player activates only small portions of design sheet 26 at a time.

Separator 24 may be formed in a number of shapes. For example, in FIG. 6, the separator is formed in a triangular shape, whereas in FIG. 2, it is formed as a square. Either form, as well as others, may be equally effective. Separator 24 may also be formed from a variety of differing materials such as rubbers, plastics, metals or the like. It can be rubber-like and act as a gasket or it can be porous or sponge-like so as to assist in absorbing excess activating fluid. In FIG. 7, separator 24 has been eliminated. Spaces 28 are not required, but are only preferred. Weakened portions 30 continue to break upon application of fluid pressure thereon. Fluid 22 traverses the breaks (at Point E) in weakened portions 30 and travels by way of capillary action along the surface of design sheet 34. It is also possible for separator 32 to be separate entities apart from its respective design sheet as shown in FIG. 6. However, in the preferred form, separators 24 are integrated with design sheet 26.

In FIG. 8, the composite is provided with layer breaking tips 40 to assist in severing retaining layer 20. Preferably, tips 40 are aligned to fall along a line of weakened portions 30. Upon application of downward pressure on upper flat surfaces 48, retaining layer 20 sags downwardly and contacts tip 40 to facilitate formation of a hole therein. FIG. 9 shows another embodiment of the invention employing layer breaking tips 42 attached to board 12. Tips 42 provide sufficient force against design sheet 26 to transfer through to retaining layer 20.

Retaining layer 20 may be selected from a variety of materials, although any fluid resistant material may be used. Preferably a saran-type sheet is employed. In any event, the material may not be dissolvable by the activator fluid. Similarly, upper layer 16 may be formed from a wide variety of materials. It should be transparent in order that designs may be viewed therethrough, and should be semi-rigid so as to be strong enough to reliably contain fluids, yet be capable of being deformed when subjected to force on upper surface 48. Upper sheet 16 and retaining layer 20 are preferably welded together at their contact points by a heat seal to insure that fluids 22 remain contained within containers 18. It is, however, possible to employ other seal means such as adhesives or the like.

FIG. 1 shows a word game as an illustrative manner in which the invention may be employed. It is within the scope of the invention that composite 14 may be employed in any number of entertainment or educational uses. For example, containers 18 may be closely spaced in a honeycomb configuration to achieve near complete coverage of composite 14. Design sheet 24 may also then have a continuous design such as a likeness of a famous person. By activating all of the honeycomb cells, the user "paints" a picture. Preferably, the design sheet 34, 34' is formed in the manner as shown in FIGS. 6 and 7. In that configuration the design sheet is completely flat, and subsequent to complete activation of design sheet 34, upper layer 16 and 20 and containers 18 may be peeled from the remaining portion of the composite to reveal a picture suitable for framing.

Fluids 22 may be of any type suitable to activate design sheet 26. For example, invisible designs on sheet 26 may be formed from chemicals or printing inks known in the art. Such chemicals and printing inks are invisible until contacted with an activating liquid. In the case of printing inks, such an activating fluid is preferably water. Any number of liquid chemical fluid activators may also be employed. When chemical fluids are employed, it is possible that different chemicals be used in each container 18.

By using the composite sheet in its preferred form, with invisible printer's ink employed on the design sheet, it is possible to use water as an activation fluid. This provides an inexpensive, non-messy and safe educational and/or entertainment means.

Although this invention has been described in connection with specific forms thereof, it will be appreciated that a wide array of equivalents may be substituted for the specific elements shown and described herein without departing from the spirit and scope of this invention as described in the appended claims.

I claim:

1. A composite sheet for forming visually observable designs comprising:
   a transparent deformable upper layer having a plurality of pockets formed therein:
   a transparent intermediate layer sealed to said upper layer along edges of said pockets to form a plurality of containers;
   a lower layer connected to said intermediate layer, said lower layer having a plurality of fluid activatable invisible designs formed thereon; and
   invisible design activation fluid contained within said containers to transform said invisible designs into visually observable designs upon breaking of said intermediate layer adjacent said containers by pressure exerted against said upper layer and subsequent contact of said fluid with said lower layer.

2. The composite sheet as defined in claim 1 wherein said intermediate layer has a plurality of weakened sections therein for each of said containers.

3. The composite sheet as defined in claim 1 wherein a separator lies between said intermediate layer and said lower layer along said pocket edges.

4. The composite sheet as defined in claim 3 wherein said separator is selected from the group consisting of rubber, plastic or could be hard plastic, metal, etc.

5. The composite sheet as defined in claim 3 wherein said separator is a porous or sponge-like substance.

6. The composite sheet as defined in claim 3 wherein said separator is integral with said lower layer.

7. The composite sheet as defined in claim 3 wherein said separator is triangularly shaped in its cross-section.

8. The composite sheet as defined in claim 3 wherein said separator is rectangularly shaped in its cross-section.

9. The composite sheet as defined in claim 3 wherein said lower layer has an upwardly facing pointed tip to facilitate breaking of said intermediate layer upon application of downward force on said upper layer.

10. The composite sheet as defined in claim 1 wherein said lower sheet is treated with invisible printer's ink.

11. The composite sheet as defined in claim 1 wherein said fluid is water.

12. The composite sheet as defined in claim 3 wherein said separator is integral with said intermediate layer.

13. The composite sheet as defined in claim 1 wherein said lower sheet is treated with a chemical activator.

14. The composite sheet as defined in claim 1 wherein said fluid is a chemical.

15. The composite sheet as defined in claim 1 further comprising a play board attachable to said sheet, said board having a plurality of upwardly extending projectile shaped tips to engage and break said intermediate layer.

16. The composite sheet as defined in claim 1 further comprising an attachable play board.

* * * * *